May 10, 1927.
S. I. CORY
1,628,392
TELEGRAPH DISTORTION MEASURING SYSTEM
Filed Oct. 30, 1925     3 Sheets-Sheet 1
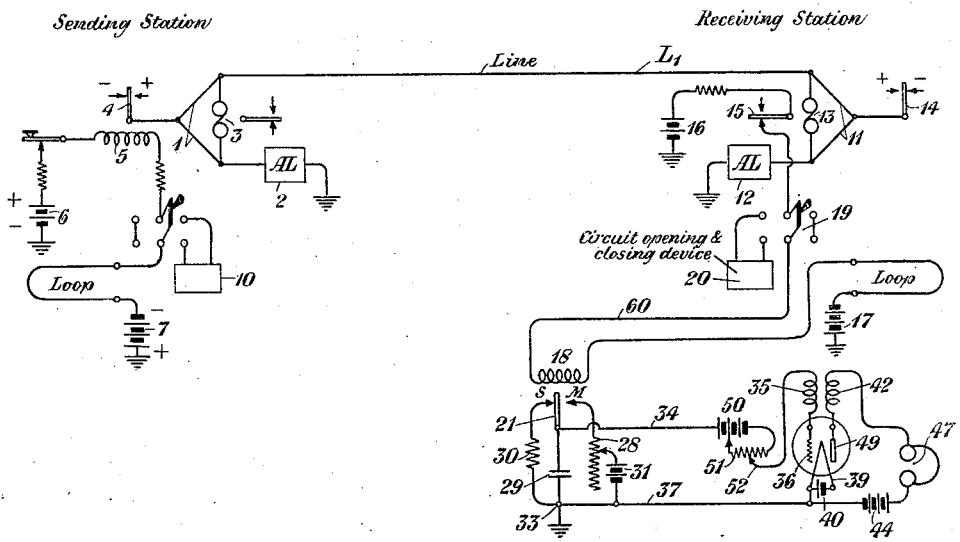
Fig. 1
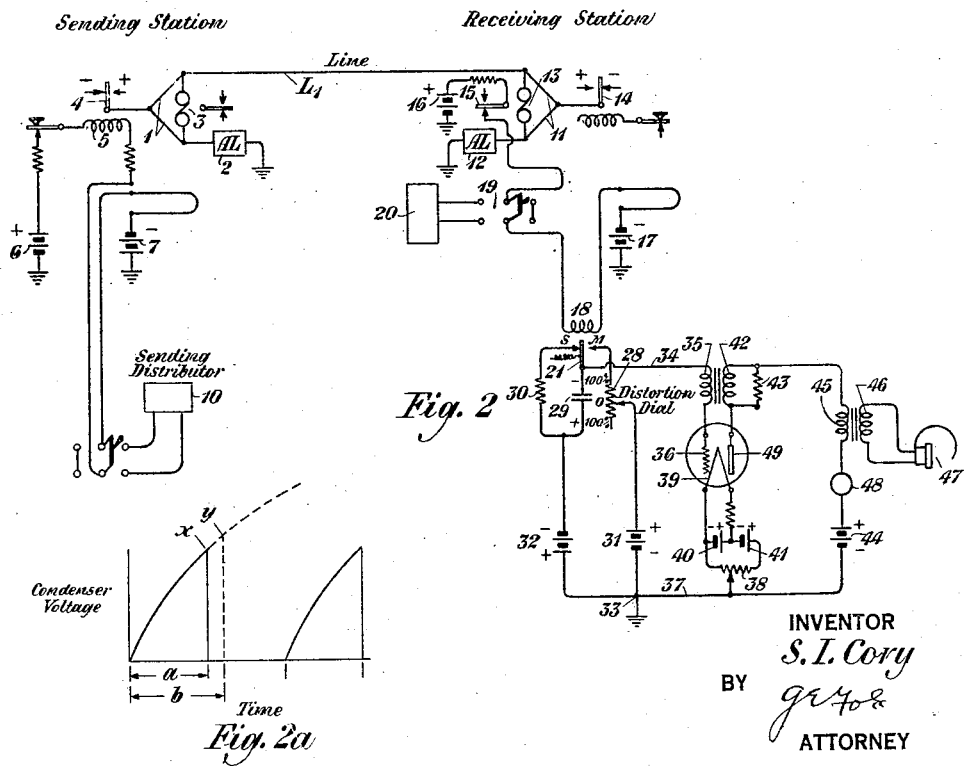
Fig. 2
Fig. 2a
INVENTOR
S. I. Cory
BY
ATTORNEY

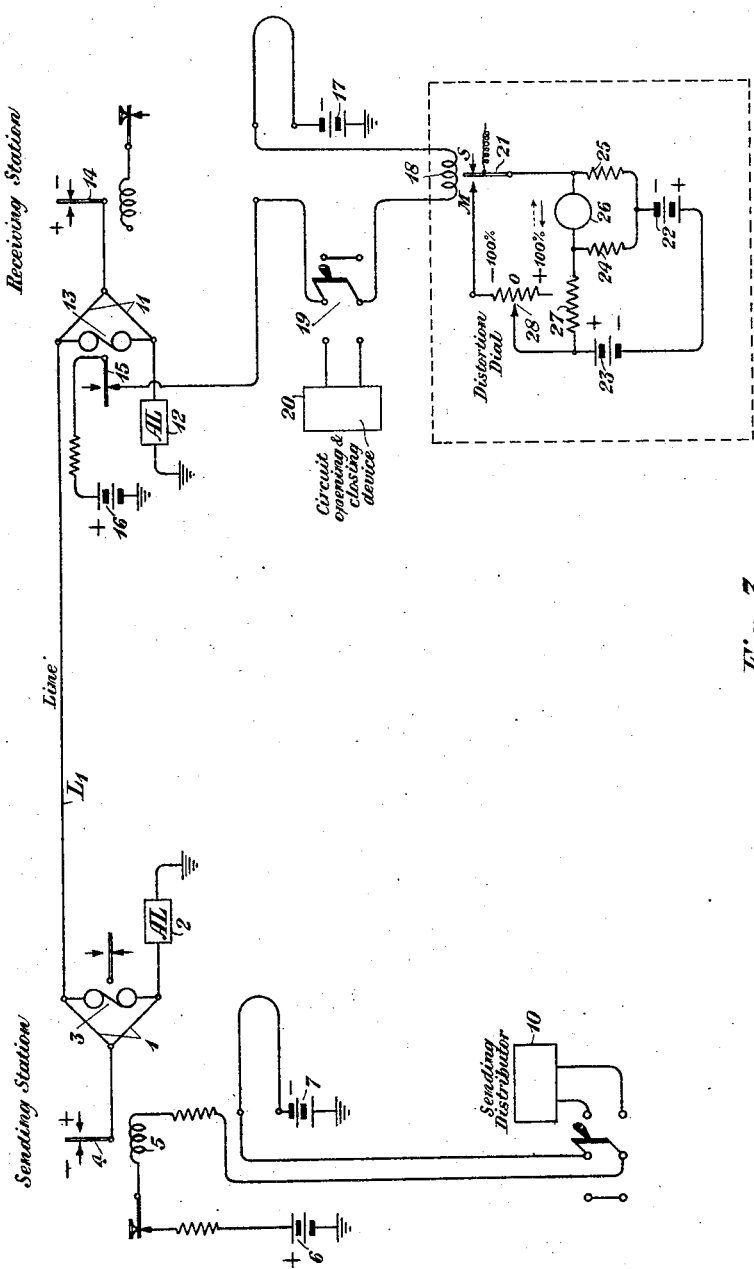

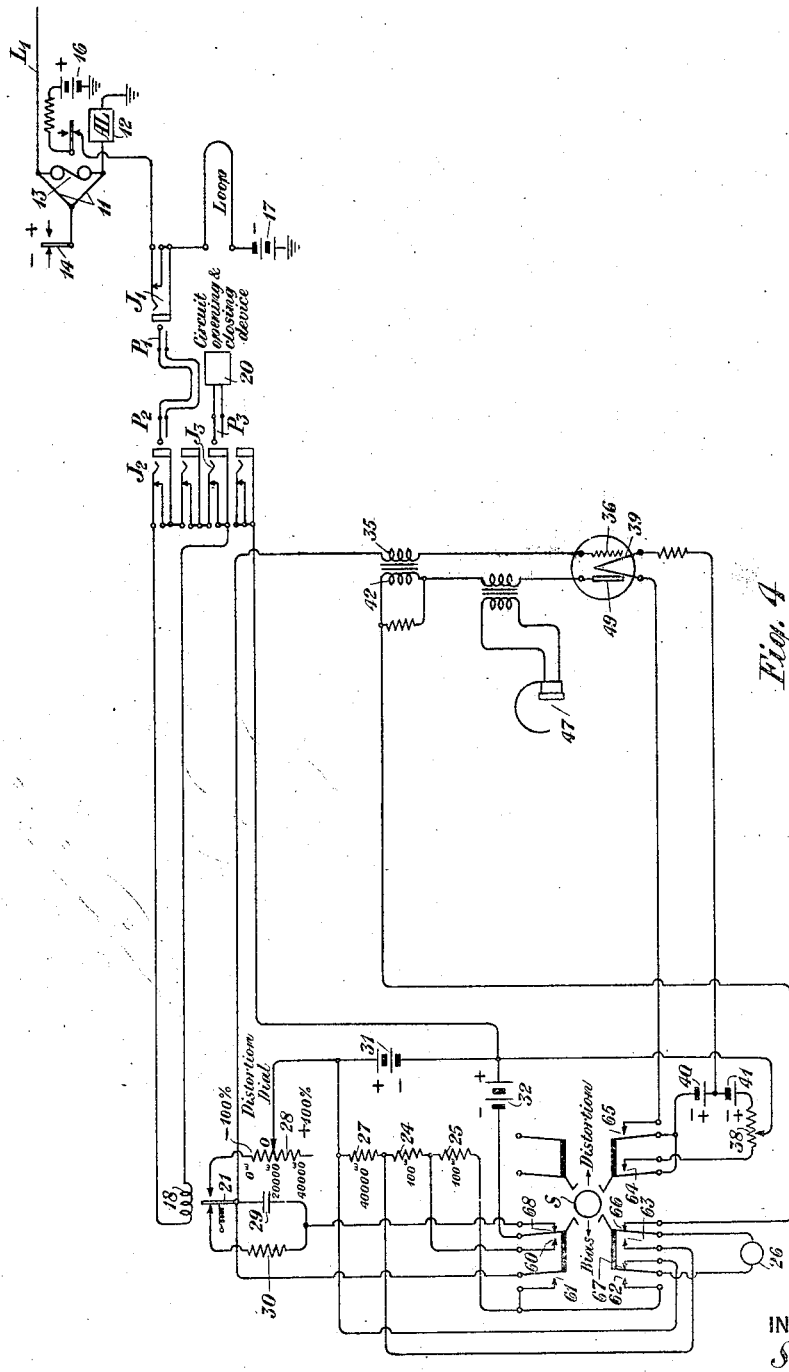

Patented May 10, 1927.

1,628,392

UNITED STATES PATENT OFFICE.

SAMUEL I. CORY, OF ELMHURST, NEW YORK, ASSIGNOR TO AMERICAN TELEPHONE AND TELEGRAPH COMPANY, A CORPORATION OF NEW YORK.

TELEGRAPH DISTORTION MEASURING SYSTEM.

Application filed October 30, 1925. Serial No. 65,859.

This invention relates to telegraph transmission measuring systems, and particularly to a system of that general class characterized by means for measuring bias and total distortion of the impulses constituting a telegraph signal character.

Heretofore in the maintenance of telegraph service, the quality of transmission has been approximately determined by means of milammeters in parts of the circuit and also by the usual listening tests. While such tests have been of considerable value, the need has been felt for some time for means to quantitatively measure the amount of distortion or change in duration which individual marking and spacing elements suffer during the course of transmission.

It is the object of this invention to provide a method and means for the convenient, quick and direct determination of the percentage of bias and total distortion of the marking or spacing elements of a signal character, which determination requires no computation and which produces results that are fairly accurate.

A further advantage possessed by the invention resides in the fact that the operations for measurement do not disturb the normal connections of the circuit, so that when the measurement is finished and the measuring apparatus disconnected from the loop circuit, the circuit is ready for its normal commercial use.

This invention will be readily understood from the following description when read in connection with the attached drawing of which Figure 1 shows schematically a circuit arrangement for measuring the total distortion of a signal element; Fig. 2 is a modification of the arrangement shown in Fig. 1, the differences between which will be specifically described hereinafter; Fig. 2ª is a characteristic curve of the voltage of the condenser employed in the systems shown in Figs. 1 and 2; Fig. 3 shows schematically the means for the measurement of bias; and Fig. 4 is a circuit arrangement of a measuring set having suitable switching means whereby the total distortion and bias may be separately determined.

In Fig. 1, $L_1$ represents a line circuit having suitable terminal apparatus connected with each end thereof for the duplex or half duplex operation of the circuit. This apparatus at the receiving station comprises the bridge arms 11, one of which is connected with the line $L_1$ and the other with the artificial line 12. The apex of the arms 11 is connected with the armature 14 of the transmitting device. A receiving relay 13 is connected across the arms 11, the armature 15 of the said relay being connected with a grounded source of potential 16. One of the contacts of relay 13 is connected by conductor 60 with the loop circuit of the receiving station, with which is connected the grounded battery 17, the polarity of which is such as to aid the battery 16. The connection between the contact of relay 13 and the loop circuit is effected through the switch 19 when the blades of the switch are thrown to the right. The left-hand contacts of the switch are connected with a source 20 of undistorted signals. This device, which, in itself, forms no part of the invention, is adapted to open and close the loop circuit in a predetermined manner to simulate the transmission of signals thereover. A preferable signal character for measuring total distortion is the Morse letter C, and for measuring bias is a series of dots, both of said signals having the dotting rate of 15 dots per second. The device 20 is arranged to open and close the loop circuit for the transmission of said signals.

The measuring circuit comprises a relay 18, the winding of which is connected into the loop circuit in the manner shown. The armature 21 of this relay is connected with one side of the condenser 29, the other side of which is grounded at the point 33. One of the contacts of this relay, namely, the spacing contact, is connected through the resistance 30 to ground. The marking contact is connected through the variable resistance 28 with one side of the grounded battery 31. The armature 21 is also connected with the grid 36 of a vacuum tube amplifier, the connection including the negative battery 50, part of which may be shunted by the potentiometer 51—52, the purpose of which is to adjust the voltage applied to the grid. The grid connection also includes one of the windings 35 of a feed-back transformer, the other winding 42 being connected with the plate 49 of the said tube. The plate circuit also includes a source of plate potential 44 and an indicating device such as the head receivers 47. The filament 39, which is activated by the source of current 40, is connected with the grounding point 33.

The manner in which the aforedescribed circuit functions to measure total distortion is as follows:

The circuit of the measuring set may be considered as made up of two parts, the first of which may be termed the voltage producing circuit, and the second, the voltage indicating circuit. The voltage producing circuit comprises the condenser 29, connected with the armature of the relay 18, the source of potential 31 and the variable resistance 28. The voltage indicating circuit comprises the vacuum tube, together with its grid voltage biasing arrangement, and the feed-back coupling between the plate and the grid circuits. It will be seen that when the armature 21 rests upon the marking contact of relay 18 the condenser 29 will be connected across the battery 31 in series with the variable resistance 28. The voltage that the condenser 29 will acquire depends upon the time during which the armature rests upon the marking contact. The duration of time depends upon the length of the dot to be measured, so that the voltage on the condenser is a measure of the length of the dot. During the spacing interval the condenser discharges completely through the resistance 30, the magnitude of which is so proportioned as to effect this result. The variation of condenser voltage with time when the capacity of the condenser 29 and the magnitude of the resistance 28 are constant is shown graphically in Fig. 2$^a$. During the length of time represented by $a$, the condenser voltage will reach the value represented by $x$, which is the value for an undistorted dot. If the dot is distorted, for example, lengthened, as represented by $b$, the value of the condenser voltage would be represented by $y$. The voltage taken by the condenser may be controlled by the setting of the resistance 28. Thus, by increasing the resistance, the voltage acquired by the condenser, for example, during the interval $b$, may be reduced from $y$ to $x$, and, in like manner, by decreasing the resistance, the voltage taken by the condenser during a given interval might be increased. The amount of change of the resistance 28, expressed as a percentage of the original resistance, is the percentage distortion of the marking element of a signal character. The measurement of the condenser voltage is effected by means of the voltage indicating circuit. In the use of this circuit the biasing potential of the source 50 is adjusted by means of the potentiometer 51—52, so that for the voltage of the condenser representing an undistorted dot, as, for example, the voltage represented by $x$ of Fig. 2$^a$, will just be sufficient to produce a slight oscillation of the vacuum tube circuit, which would be indicated by means of the receiver 47. Having in mind the general principles upon which the measuring system operates, the manner of making a test for the determination of total distortion is as follows:

With the relay 18 connected into the circuit in the manner shown, and with no transmission of signals over the line, the blades of the switch 19 are thrown to the left so as to connect the source 20 into the loop circuit. This source is adapted to open and close the circuit at the rate of fifteen times per second. Accordingly the armature 21 will touch its marking contact 15 times per second so as to charge the condenser at that rate, and in like manner will touch its spacing contact the same number of times so as to discharge the condenser through the resistance 30. The object in connecting the source 20 with the loop circuit is to calibrate the measuring apparatus before beginning to receive signal impulses from the line $L_1$. With the contact of the variable resistance 28 set at the midpoint of the said resistance, the potentiometer 51—52 is varied, so that the negative potential applied to the grid 36 by the source 50 will be of such magnitude that the voltage acquired by the condenser 29 during each marking impulse will just produce oscillations in the output circuit of the said tube. With the circuit thus adjusted, it will be apparent that when distorted signals are applied to the loop circuit the condenser will acquire a voltage greater or less in magnitude than for undistorted signals. Therefore, in the measurement of signals transmitted over the line $L_1$ a device, such as 10, is connected with the loop circuit of the distant end of the line $L_1$, so as to transmit thereover a succession of dots at the rate of fifteen per second. These impulses actuate the relay 13, so that its armature opens and closes the loop circuit at that rate. If a dot is lengthened as a result of propagation over the line $L_1$ and through the receiving circuit, the armature 21 is held upon its marking contact a greater length of time than for an undistorted dot. In consequence thereof the condsenser 29 receives a greater charge than for the undistorted dot, which raises its voltage, for example, to that represented by $y$ of Fig. 2$^a$. This greater voltage produces oscillations of greater intensity in the measuring circuit which are manifested by the receiver 47. When this is apparent, the variable resistance 28 is increased, thus reducing the potential that the condenser 29 takes for the distorted dot to that which the condenser should take for an undistorted dot. When the resistance has been so varied that the click produced in the receiver 47 is the same as for an undistorted dot, the setting of the resistance 28 indicates the percentage distortion of the marking impulse transmitted over the line. And in like manner, if the transmission effected a shortening of the dot the armature 21 would not remain upon its marking contact sufficiently long for the condenser 29 to acquire the voltage that such condenser would acquire for an undistorted dot. Accordingly, the resistance 28 would be diminished until the voltage across the condenser 29 would be such as to produce the slight oscillation of the vacuum tube circuit which would be produced by an undistorted dot. The setting of the resistance 28 when this condition exists indicates the percentage of shortening of the dot due to its transmission over the line.

The arrangement shown in Fig. 2 is, in general, substantially the same as the circuit shown in Fig. 1, differing therefrom in certain details which, from a service standpoint, renders the circuit of Fig. 2 an improvement upon that shown in Fig. 1. These modifications relate to the negative biasing battery and the method of adjusting the zero of the grid potential. In Fig. 1, the elements performing these functions were connected directly with the grid lead of the voltage indicating circuit. In Fig. 2, the negative biasing potential is supplied by the source 32. This source, in addition to performing the function mentioned above, also aids the source 31 to charge the condenser 39 whenever the armature 21 moves to its marking contact. The sources 32 and 31, being equal in magnitude, tend to increase the amount of change in voltage on the condenser due to a given change in duration of the dot, which fact tends to increase the accuracy. The means for adjusting the zero of the circuit comprises the battery 40 normally used for activating the filament of the tube and an additional batery 41 in series therewith. A potentiometer 38 is connected across the said batteries, so that the potential applied to the grid of the tube may be readily adjusted. This adjustment consists merely in adding or subtracting a certain potential from the potential of the source 32 connected with the grid of the tube. The method of measuring the total distortion of the circuit $L_1$ by the measuring circuit shown in Fig. 2 is similar to that described in connection with Fig. 1.

Fig. 3 shows an arrangement for measuring the bias produced by the transmission of signals over the line $L_1$. In this figure the same reference numerals have been used to indicate parts similar to those shown in Figs. 1 and 2. The measuring circuit per se comprises the relay 18 connected in series with the loop circuit at the receiving station. The armature 21 of this relay is connected with one of the ratio arms 25 of what is, in effect, a Wheatstone bridge network. The junction point of the arms 24 and 25 is connected with the source of potential 22. A meter 26 is connected across the outer ends of the arms 24 and 25. A resistance 27 constitutes, in effect, the third arm of the bridge, and the variable resistance 28 forms the fourth arm whenever the armature 21 touches the marking contact of the relay 18. The source of potential 23 is connected in series with 22.

With the resistance 28 set at its midpoint, the air gap and the spring tension of the armature of the relay should be adjusted until the meter needle vibrates about the zero point, assuming that the armature 21 is repeating unbiased signals, that is, it is on its marking contact one-half the time and off the remainder of the time. In this Wheatstone bridge circuit equal and opposite currents flow through the meter 26 when the relay armature is on its spacing contact and on its marking contact, respectively, provided the resistance between the midpoint and one of the terminals of the resistance element 28 is one-half of the resistance of the element 27. If the relay armature 21 is repeating unbiased signals, the average current through the meter will be zero, and the needle will vibrate about the zero mark. With biased reversals the average current through the meter is no longer zero, but can be brought back to zero by adjusting the value of the resistance 28. When this condition obtains the relations existing in this circuit are such that the percentage change in the resistance 28 necessary to make the average current zero is equal to the percentage bias. The resistance 28 may be calibrated and the dial arranged to indicate the percentage bias corresponding to the percentage change of resistance 28.

In measuring bias, the set must be calibrated for undistorted signals in order to be capable of indicating the magnitude of bias. In calibrating, the switch 19 is moved to its left-hand contact so as to connect the circuit opening and closing device 20 into the loop circuit. This device opens and closes the circuit containing the winding of relay 18 a predetermined number of times, as, for example, at such a rate as to represent the transmission of fifteen dots per second.

Having adjusted the measuring set for the reception of undistorted signals, the switch 19 is then moved to its right-hand contacts so as to close the loop circuit therethrough. Signals are then transmitted from the sending station by means of the circuit opening and closing device 10. This device may be of any form adapted to operate the relay 9, thus controlling the transmission of reversals by the transmitter 4 at a definite rate, as, for example, fifteen dots per second. These reversals in the course of their transmission over the line circuit $L_1$ may be biased, and consequently the impulses transmitted over the loop circuit at the receiving station by the operation of the relay 13 would also be biased. The variable resistance 28 should be adjusted so as to permit zero deflection of the needle of the meter 26, and the setting of the dial of the resistance 28 when this condition obtains would represent the magnitude of the bias of the signals.

The arrangement shown in Fig. 4 is a combination of the arrangements shown in Figs. 2 and 3 in order to provide a workable circuit for measuring bias and total distortion. The same numerals have been used to indicate parts similar to those shown in the preceding figures. This circuit comprises, in addition to the various elements shown in the preceding figures, a switch S which, when thrown to the left, puts the circuit in condition for measuring bias, and when thrown to the right, for measuring total distortion. The circuit also comprises a plurality of jacks of which $J_2$ and $J_3$ are typical for connecting the circuit of the measuring set to the loop circuit and to a circuit opening and closing device 20. By inserting the plug $P_2$ in the jack $J_2$ and the plug $P_1$ in the jack $J_1$, the loop circuit is effectively connected with the circuit containing the winding of the relay 18. The device 20 is connected with the circuit by inserting the plug $P_3$ in the jack $J_3$. When the switch S is thrown to the left, the contacts 60, 61, 62 and 63 are closed, thus connecting the meter 26 across the outer ends of the ratio arms 24 and 25. When the marking impulse through the winding of the relay 18 moves the armature 21 to its marking contact, a circuit will be established which may be traced from the negative pole of the battery 22, through contact 60 to the apex of the arms 24 and 25. Here the current divides, part going through arm 25, armature 21, marking contact M, part of the resistance 28 and battery 31 to the positive pole of battery 32. The current flowing through arm 24 will flow through resistance 27 of battery 31 and thence to the positive pole of battery 32. The meter 26, which is bridged across the outer ends of the arms 24 and 25, will indicate an inequality between the currents flowing through the arms, and this inequality may be measured by varying the resistance 28 until zero deflection of the meter is obtained. While the invention is not limited to the elements having the magnitudes shown in the drawing, it is deemed desirable to set forth certain values of these elements which have been found to produce desirable results. Thus, for example, the variable resistance 28 may have a total resistance from one terminal to the other of 40,000 ohms. This may be divided into 40 units of 1,000 ohms. There will thus be 20 units between the midpoint, and each terminal of this resistance and the magnitude of each unit would thus be 5% of the resistance between the midpoint and each terminal.

To measure total distortion, the switch S is thrown to the right, thus connecting the sources of potential 40 and 41 with the filament and the grid of the vacuum tube, the said connection being effected through the contacts 64 and 65 of the switch. Furthermore, when the switch is moved to the right, 65, 66, 67 and 68 are closed, which serves to connect the negative biasing battery 32 with the grid of the vacuum tube, and also serves to connect the batteries 31 and 32 in series with the condenser 29. The manner in which this circuit functions is the same as in Figs. 2 and 3, and further description is deemed unnecessary.

While the invention has been disclosed as embodied in a particular form, it is to be understood that it is capable of embodiment in other forms without departing from the spirit and scope of the appended claims.

What is claimed is:

1. In a system for measuring total distortion of telegraph signaling impulses, the combination with a source of impulses to be measured of a relay responsive to the said impulses, a condenser connected with the said relay, a source of potential in series with a variable resistance the magnitude of which for any setting is known to charge the said condenser during the time in which the said relay remains operated by one of the said impulses, and a vacuum tube having its input side connected across the said condenser and its output side connected with an indicating device to measure the charge upon the said condenser.

2. In a system for measuring total distortion of telegraph signaling impulses, the combination with a source of impulses to be measured of a relay responsive to the said impulses, a condenser connected with the said relay, a source of potential to charge the said condenser during the time in which the said relay remains operated by one of the said impulses, a variable resistance, the magnitude of which for any setting is known, connected in series with said source, and a voltmeter comprising a vacuum tube having coupled output and input circuits, a source of potential connected with the input circuit to almost suppress oscillations when undistorted impulses actuate the said relay, and means connected with the output circuit to detect oscillations.

3. In a system for measuring telegraph distortion, the combination with a source of impulses the time-length of which is to be measured of a relay having its winding connected with the said source and its armature connected with a condenser, a source of potential in series with a known variable resistance connected with one contact of said relay, and means connected with the other contact to discharge the said condenser, a vacuum tube oscillator having coupled input and output circuits, the said input circuit being effectively connected across the said condenser and having a control source of negative potential connected therewith, the said output circuit having a source of plate voltage and an indicating device to determine the existence and magnitude of oscillations.

4. In a system for measuring total distortion of telegraph signaling impulses, the combination with a source of impulses the time-length of which is to be measured, of a relay responsive to the said impulses, a condenser connected with the said relay, a source of potential in series with a known variable resistance to charge the said condenser during the time in which the relay remains operated by one of the impulses, and a voltmeter having a vacuum tube with coupled input and output circuits and a source of control potential connected with the input circuit, the magnitude of which limits the amplitude of oscillations when undistorted signals operate the said relay, and means connected with the said output circuit to detect said oscillations.

5. In a system for measuring total distortion of telegraph signaling impulses, the combination with a source of impulses to be measured of a relay responsive to the said impulses, a condenser connected with the said relay, a source of potential to charge the said condenser during the time in which the said relay remains operated by one of said impulses, a vacuum tube oscillator having its input side connected across the said condenser and its output side connected with an indicating device, and means connected with the said source to vary at will the voltage applied to the said condenser during the time of operation of said relay until the oscillations for distorted and undistorted impulses are of substantially the same amplitude.

6. In a system for measuring total distortion of telegraph signaling impulses, the combination with a source of impulses, the variation of which from normal are to be measured, of a condenser having a source of direct potential variable at will, adapted to be connected therewith, means responsive to the said impulses to connect the said source with the said condenser to effect the charging of the said condenser and a vacuum tube oscillator connected across the said condenser and having an indicating device connected therewith to indicate the duration of the said signal impulse by virtue of the difference in amplitude of oscillations for distorted and for undistorted impulses.

7. The method for measuring the distortion of telegraph signals which consists in allowing an energy storage system to take charge from a controllable source during the interval of time between the beginning and ending of an undistorted impulse, controlling the amplitude of electrical oscillations by the magnitude of said charge, noting the amplitude of the said oscillations, then allowing the said storage system to take a charge during the time elapsing while receiving a distorted impulse and comparing the amplitude of oscillations controlled by such charge with the amplitude for the undistorted impulse.

8. The method for measuring the distortion of telegraph signals which consists in allowing an energy storage system to take a charge from a controllable source during the interval of time between the beginning and ending of an undistorted impulse, controlling the amplitude of electrical oscillations by the magnitude of said charge, noting the amplitude of the said oscillations, then allowing the said storage system to take a charge during the time elapsing while receiving a distorted impulse, comparing the amplitude of oscillations controlled by such charge with the amplitude for the undistorted impulse, varying the voltage of the source of voltage by which the storage system is charged until the same amplitude of oscillations exists for distorted as for undistorted impulses, and determining the degree of distortion by the amount of change of voltage of the said controllable source.

9. The method for measuring distortion of telegraph signals which consists in storing an electrical charge, the magnitude of which bears a definite relation to the length of an undistorted signal impulse, applying the said charge to the grid of an oscillator and adjusting the grid voltage so that the oscillations will be of minimum magnitude for the undistorted impulse, then applying impulses of signals transmitted over or through a medium capable of producing an abnormal lengthening or shortening of the said impulses, charging the said energy storage system during the time represented by the said abnormal impulses, applying that charge to the grid of the oscillator, varying the voltage by which the said storage system is charged until the amplitude of oscillations for abnormal impulses and for normal impulses are substantially equal and determining the variation from normal of the said abnormal impulses by the ratio of the charging voltage for abnormal signals to that for normal signals.

In testimony whereof, I have signed my name to this specification this 29th day of October, 1925.

SAMUEL I. CORY.